E. B. AYRES.
TRUCK UNLOADING DEVICE.
APPLICATION FILED NOV. 20, 1911.
1,018,862.
Patented Feb. 27, 1912.
2 SHEETS—SHEET 1.
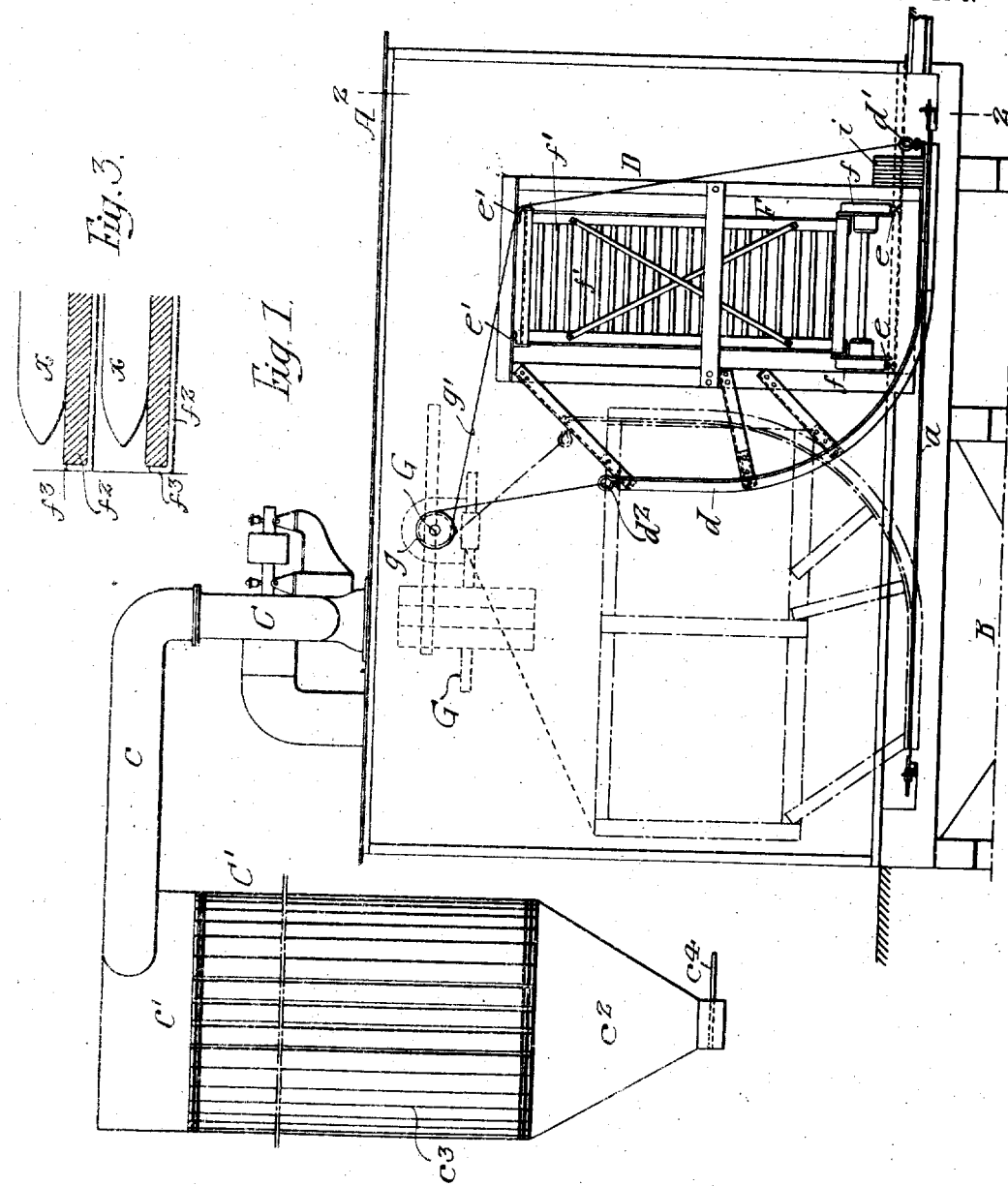
Witnesses—
Walter Chism
Willa A Burrows
Inventor—
Elwood B. Ayres.
by his Attorneys
Horton & Thom E. B. AYRES.
TRUCK UNLOADING DEVICE.
APPLICATION FILED NOV. 20, 1911.
1,018,862.
Patented Feb. 27, 1912.
2 SHEETS—SHEET 2.
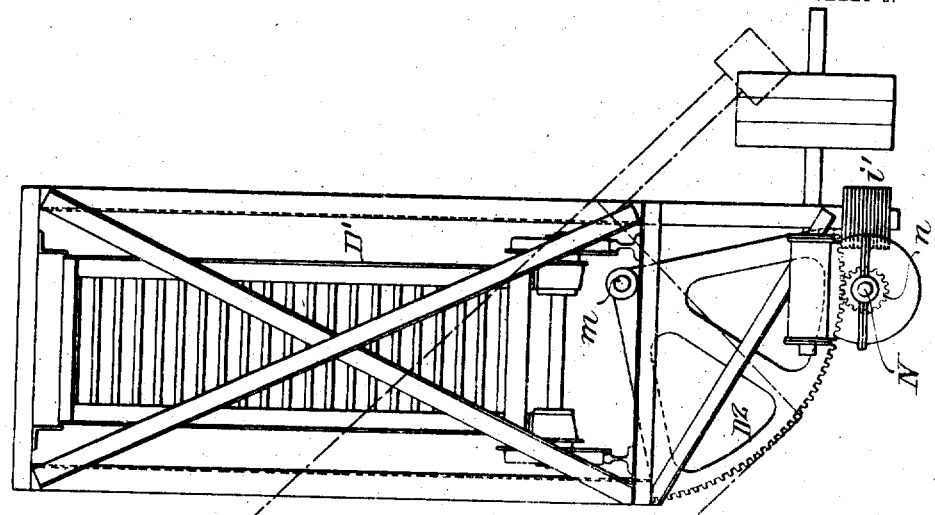
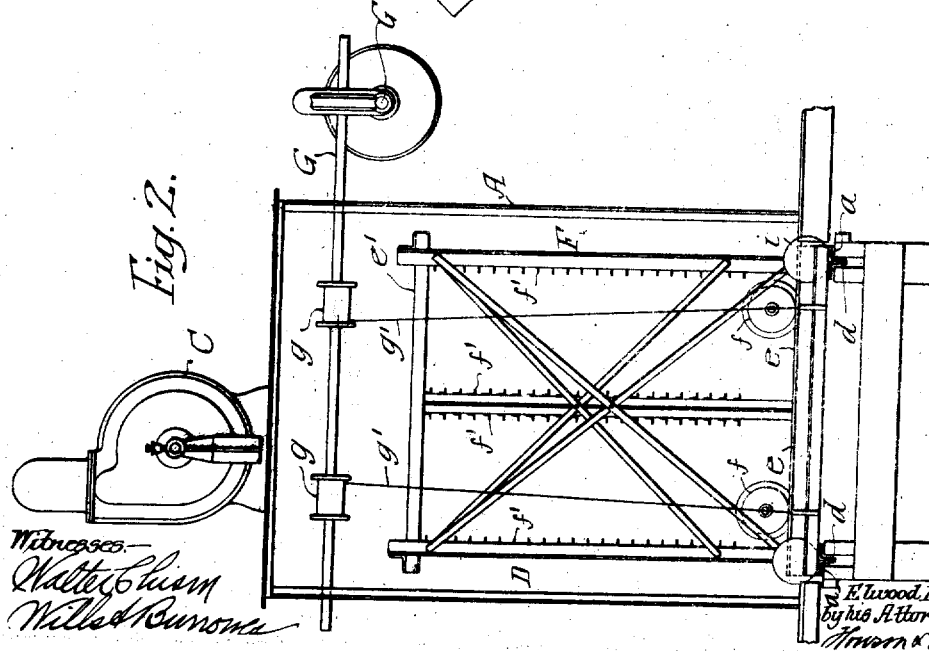

UNITED STATES PATENT OFFICE.

ELWOOD B. AYRES, OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

TRUCK-UNLOADING DEVICE.

1,018,862. Specification of Letters Patent. Patented Feb. 27, 1912.

Application filed November 20, 1911. Serial No. 661,289.

*To all whom it may concern:*

Be it known that I, ELWOOD B. AYRES, a citizen of the United States, residing in Philadelphia, Pennsylvania, have invented certain Improvements in Truck-Unloading Devices, of which the following is a specification.

This invention relates to certain improvements in apparatus for handling white lead and other material from which poisonous dust arises.

The object of the invention is to provide an apparatus for discharging the trays or cakes of white lead in such a manner that the dust arising from the material will be carried away and not be inhaled by the workmen. This object I attain by providing an inclosed chamber into which the material is discharged and providing a suction fan for carrying the dust away from the chamber and separating it by any suitable dust collector.

In the accompanying drawings:—Figure 1, is a longitudinal sectional view through the casing showing a truck in position on the tilting device; Fig. 2, is a transverse sectional view on the line 2—2, Fig. 1; Fig. 3, is a view of a detail of a truck showing the tray and cake in position; and Fig. 4, is a view illustrating a modification of the means for tilting the frame.

A is a casing forming substantially an air tight chamber.

B is a hopper at the bottom of the chamber into which the material is discharged.

C is a suction fan, in the present instance communicating with the upper portion of the chamber and through a pipe $c$ with a dust collector C' of any suitable type. In the present instance this dust collector consists of a chamber $c'$ connected to a hopper $c^2$ by a series of fabric flues $c^3$; the meshes of the fabric being such that the air will readily pass therethrough, but the dust be retained therein. As the dust accumulates in the hopper $c^2$, it may be discharged by opening the valve $c^4$.

D is the discharge device, which is located within the casing A and this discharge device has T-shaped rockers $d$, in the present instance, which are mounted on the rails $a$. Secured to the base of the discharge device are two rails $e$, $e$ for the reception of the wheels $f$ of the truck F, which has a series of slideways $f'$ for the trays containing the cakes of white lead or like material. This truck can be designed in any manner desired.

On the upper end of the discharge device are guide rails $e'$ made of angle bars in the present instance, and these guide rails are so proportioned with respect to the truck that the latter will fit snugly between them and the rails $e$, so that when the discharge device is tilted the truck will be firmly held in the discharge device.

It will be noticed that the discharge device turns from the upright position to the horizontal position and when the truck is turned with the discharge device the trays containing the cakes of material are in a vertical position; the cakes being discharged by their own weight from the trays, while the trays are held in the frame of the truck by lips or other devices, Fig. 3. Many different means may be used to tilt the discharge device, and I have shown a shaft G on which are two drums $g$ and ropes or chains extend from the drums to the tilting discharge device. One rope $g'$ extends to a point $d'$ at the rear of the frame and the other rope extends to a point $d^2$ at the forward end of the frame so that as the shaft G is turned in one direction one rope will be slackened while the other will be taken up to tilt the discharge device forward to discharge the material, and when the shaft is reversed the device is returned to its upright position.

The shaft G is driven through a worm and worm wheel from a power shaft G', but other means for driving the shaft may be resorted to without departing from the main feature of the invention.

The frame of the truck is made as clearly shown in Fig. 3; the ways for the trays being made of angle bars $f^2$ and these angle bars are turned in at one end $f^3$ to form stops for the trays $s$, so that when the truck is tilted with the frame the trays will remain in their slideways, but the cakes of white lead or other material $x$ carried by the trays will be discharged.

As illustrated in Fig. 2, the truck has two sets of trays and it will be understood that the construction of the truck and the arrangement of the trays may be modified according to circumstances. The discharge device is preferably provided with a counterbalance weight $i$ to properly balance the load, and this weight may be made in sections to increase or diminish the weight, as desired. The tilting mechanism is so arranged that when the discharge device is tilted it will be under the control of the ropes until it nears the discharge point, then it drops onto a stop so as to jar the cakes loose from the trays, as cakes of white lead, for instance, are placed on the trays in a wet condition and dried, and some cakes may have a tendency to adhere to the trays.

In Fig. 4, I have shown a modification of the means for turning the discharge device. Instead of relying upon a rocking frame I provide, in this instance, two racks $D^2$ which are secured to the frame $D'$ and a pinion $n$ on the shaft $N$ meshes with the teeth of this rack, so that when the shaft $N$ is tilted the frame $D'$ with the truck will be tilted. This shaft $N$ can be driven in any suitable manner. In this instance, there is a pivot shaft $m$ adapted to fixed bearings upon which the frame is mounted and on which it turns, whereas, in the device illustrated in Fig. 1, the frame rocks and has no fixed pivot.

The operation is as follows:—In this instance the trucks of white lead, or other material, from which poisonous dust arises, are removed from a drier and are wheeled into the casing A and the door closed. The suction fan creates a suction within the chamber so as to carry away any particles of dust which may arise. The discharge device, with the truck containing the trays of material, is then turned, the trays remaining in the truck while the material is discharged from the trays into the chamber formed by the casing, and, preferably into the hopper B, as illustrated in Fig. 1. The dust arising from the discharge of this material will be immediately taken up by the fan and will be driven into the dust separator where the air is removed from the dust.

The dust, in this case, will accumulate in a hopper $c^2$ and can be removed therefrom at intervals. By this means the interior of the casing is entirely clear of poisonous dust when the door is opened to remove the empty truck and to run a loaded truck in position to be discharged.

I claim:—

1. The combination of a closed casing; an exhaust apparatus connected to said casing; a discharge device mounted in the casing; and a truck carrying the material, adapted to be mounted on the discharge device and to be turned therewith to discharge the material, the dust arising from the material being carried away by the exhaust apparatus.

2. The combination of a casing; an exhaust apparatus connected to the casing; a discharge device consisting of a frame having tracks and guides; rockers on which the frame is mounted; and a truck carrying the material to be discharged adapted to the rails and held thereto by the guides when the discharge device is turned.

3. The combination of a casing; an exhaust fan communicating with the upper portion of the casing; a dust separator attached to the exhaust fan; a discharge device consisting of a frame having rockers; rails on the bottom of the casing for receiving the rockers; a hopper in the bottom of the casing; a truck having rails to receive trays on which the material is carried; and stops for retaining the trays on the rails when the discharge device is tilted; with means for tilting the discharge device with the truck and for returning it to its normal upright position.

In testimony whereof, I have signed my name to this specification, in the presence of two subscribing witnesses.

ELWOOD B. AYRES.

Witnesses:
Jos. H. Klein,
Wm. A. Barr.